(12) United States Patent
Dorvel et al.

(10) Patent No.: US 6,197,082 B1
(45) Date of Patent: Mar. 6, 2001

(54) REFINING OF TANTALUM AND TANTALUM SCRAP WITH CARBON

(75) Inventors: Robert A Dorvel, Wrentham; Leonid N. Shekhter, Newton; Ross W. Simon, Medfield, all of MA (US)

(73) Assignee: H.C. Starck, Inc., Newton, MA (US)

( * ) Notice: Subject to any disclaimer, the term of this patent is extended or adjusted under 35 U.S.C. 154(b) by 0 days.

(21) Appl. No.: 09/251,567

(22) Filed: Feb. 17, 1999

(51) Int. Cl.[7] .................................................. C22B 34/24
(52) U.S. Cl. ............................................ 75/10.13; 75/622
(58) Field of Search .................. 75/622, 10.19, 75/10.13

(56) References Cited

U.S. PATENT DOCUMENTS 4,727,928 * 3/1988 De Vynck et al. ............... 75/10.11
5,972,065 * 10/1999 Dunn et al. ..................... 75/10.19

FOREIGN PATENT DOCUMENTS 64-73028 * 3/1989 (JP) .................................. 75/10.19

* cited by examiner

*Primary Examiner*—Melvyn Andrews
(74) *Attorney, Agent, or Firm*—Perkins, Smith & Cohen; Jerry Cohen

(57) ABSTRACT

Tantalum scrap of high oxygen content is recovered and processed to metallurgical grade tantalum by fine participation. Blending with carbon or other appropriate solid reducing agent, melting in a plasma furnace (20) at about tantalum melt temperature while suppressing partial pressure of tantalum oxide gas to minimize tantalum loss of the process.

24 Claims, 4 Drawing Sheets

REFINING OF TANTALUM AND TANTALUM SCRAP WITH CARBON

BACKGROUND OF THE INVENTION

The present invention relates to the extractive metallurgy of refractory metals and in particular to tantalum and niobium refining. Tantalum refining can be defined as a process of impurity removal during metal consolidation by different sintering and melting techniques.

Oxygen has been considered as a major interstitial impurity in refractory metals, and the most traditional technique used to reduce its content has been deoxidization of refractory metal oxide within the metal (e.g. tantalum pentoxide) with carbon. The history of this method goes back into the beginning of the twentieth century when von Bolton obtained a patent (German Patent 216706, 1907) for producing ductile tantalum or niobium by adding carbon to the metal and heating the metal in vacuum, thereby removing carbon and oxygen as carbon monoxide. Rohn (German Patent 600369,1934) obtained a patent for production of niobium, and other refractory metals by adding a mixture of carbide and oxide to the molten metal pool while evacuating carbon monoxide.

Over the years the process for production of pure tantalum by carbon reduction of $Ta_2O_5$ has been further developed and now comprises of vacuum sintering at 2000° C. followed by one or two electron-beam melts to remove not only oxygen but also other impurities such as nitrogen, carbon, iron, nickel, silicon, and virtually all other elements, except for refractory metals such as W, Mo, and Nb. Four major drawbacks of this route are:

low yield (<90% Ta, see example 1, below) due to sublimation of tantalum suboxides species;
  uncontrollable yield and productivity due to inhomogeneous (not crushed) scrap feedstock;
  low melting rate due to the high impurities level (basically C, N, Si, Fe, Ni, etc.); and
  tantalum carbide formation due to inhomogeniety of the feedstock Recently, Awasthi et al., (Journal of Alloys and Compounds, 1998, 265, 190–195), suggested substitution of silicon for carbon, in order to reduce tantalum losses. The experimental bench scale data demonstrated that in the temperature range of 1800–2000° C. under $10^{-8}$ atm pressure and oxygen content <0.1% oxygen removal by SiO (g) vaporization slows down and tantalum suboxide TaO (g) starts volatilizing which may amount to significant tantalum loss and is likely to decrease a melting rate due to silicon (silica) contamination.

The tantalum industry has been facing a challenge for some time to cope with the necessity of processing and refining significant amounts of scrap, generated primarily by the capacitor industry and containing more than 40 times as much oxygen and nitrogen as normal metallurgical grade powder. This causes high tantalum losses during pyro-vacuum sintering and significantly slows down the melting rate in EB furnaces and usually calls for a second EB melting (See Examples 1 and 2, below).

It is a principal object of the present invention to provide a method of extraction of tantalum and other refractory metals from such scrap or other similar high oxygen sources.

SUMMARY OF THE INVENTION

We have discovered that tantalum losses in the form of tantalum-oxygen (or other refractory metal-oxygen) bearing species can be significantly reduced, or virtually eliminated, by carrying out carbothermic reaction of refractory metal oxide (e.g., tantalum pentoxide) at a temperature slightly higher than the melting point of the metal (tantalum) while increasing the total pressure to nearly atmospheric pressure (from about 0.2 bar to 1.0 bar depending on the refractory metal(s) involved, but preferably at about 0.5 bar for tantalum from scrap capacitors as explained below). The kinetics of the carbothermic reaction can be significantly improved by crushing or otherwise particulating tantalum scraps before melting. This results in improved melt rates also.

It is a further aspect of the invention that the oxygen rich source of refractory metal is particulated and intimately and homogeneously intermixed with reducing agent particles and preferably consolidated in a coherent form and further that the mixture (whether or not consolidated) is melted incrementally—one zone at a time with a temperature gradient of heated mixture established in the solid mixture zone adjacent to the melt and reduction begins in such zone and continues as it is eventually melted.

Thermal decomposition of tantalum pentoxide can be assessed considering the following reaction and equation (1), (2):

$$TaO_5 \rightarrow TaO\ (g) + TaO_2(g) + O_2\ (g) \tag{1}$$

$$K_1 = P_{TaO(g)} * P_{O_2(g)} * P_{TaO_2(g)} \tag{2}$$

Where $K_1$ is equilibrium constant for the reaction (1). Based on Le Chatelier's Principle, the equilibrium of the reaction (1) is shifted to the left as the total pressure increases. It can also be seen from equation (2) that by reducing the value of oxygen partial pressure, one can achieve an increase of $(P_{TaO(g)} * P_{TaO_2(g)})$ which means higher tantalum losses. This explains the fact that inert atmosphere is preferable compared to, for example, Ar-$H_2$ gas mixtures (see, Mimura, K., Nanjo, Materials Transactions, vol. 31 No. 4, 1990, 293–301) because the use of hydrogen will significantly reduce the oxygen partial pressure.

By increasing the operation temperature from 2000° C. to 3000° C. (where tantalum is the refractory metal involved and similar temperature selection at about melting point for other refractory metals) and milling the scrap into a uniformly blended powder one can speed up the reaction between carbon and tantalum pentoxide. Crushing of scrap before adding carbon is also an important step for this invention to:

help increase the rate of the carbothermic reaction;
  allow an increase of carbon/oxygen (C/O) ratio to stoichiometric value (5 mole/mole);
  result in lower residual O and C contents completely avoiding the formation of carbides (See Examples 1,2,3,4 and 5, below) and
  obtain representative samples and accurate analysis of impurities of the scrap.

By finishing the process at higher temperatures one can also reduce some impurities such as nitrogen, iron, nickel. etc., which undoubtedly increase the EB melting rate.

Other objects, features and advantages will be apparent from the following detailed description of preferred embodiments taken in conjunction with the accompanying drawings in which:

DETAILED DESCRIPTION OF PREFERRED EMBODIMENTS

Figure 1:
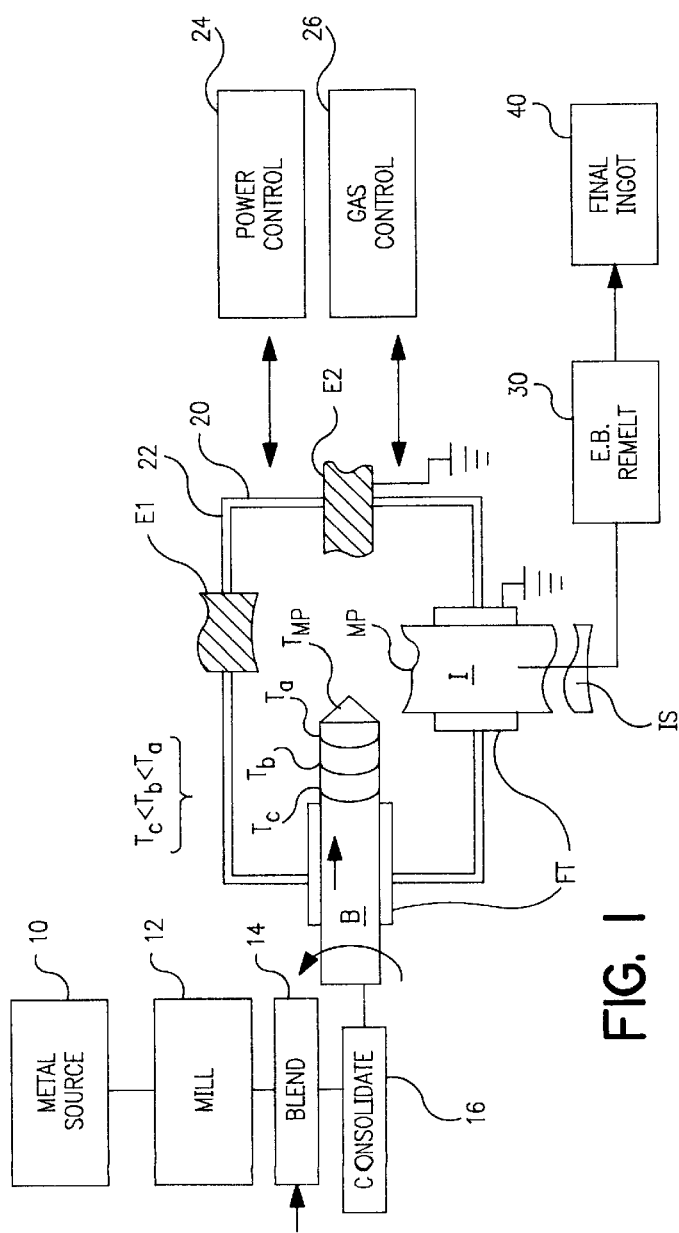
FIGS. 1, 1A are schematic diagrams of rates for practice of the process of the invention according to a preferred embodiment thereof.

FIG. 1 shows, schematically, apparatus for implementing the process flow of the present invention. Block 10 indicates a metal source, compiled typically, by (a) removal of packaging, cathode and electrolyte (manganese dioxide) from scrap capacitors, leaving a tantalum porous anode mass with residual electrolyte and tantalum oxide surface layers throughout the mass; (b) failed anodes in the course of capacitor production that have not been impregnated with electrolyte (gray anodes) and many of which have not even been formed to create anodic oxide though they do contain some intrinsically formed oxides and (c) lead wires. There is a certain selection (and pre-blending) among such material for oxygen content control as explained below. The source materials can also be derived from ceramics such as niobates, tantalates and titanates used in ferroelectric, optical and electro-optical products. Block 12 indicates milling of such material to fine particle form, typically –30 mesh, with morphology ranging from spherical to ribbon form depending on the milling techniques used. The milling even though done under inert gas localizes much of the oxygen content at surfaces of the particles and is beneficial to the process as a whole. Block 14 indicates blending of the milled powder to homogenize its own diversity of chemical impurities and morphology and to incorporate homogeneously added carbon (added as carbon, carbides and/or organic materials), optionally with blending or compacting agents such as stearic acid. Block 16 indicates consolidation of the blended mass, e.g. by cold isostatic pressing, to form a bar or block B that can be fed to a plasma furnace 20.

Figure 1A:
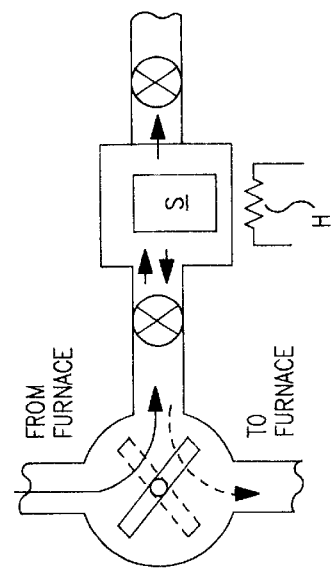

The furnace comprises a sealed vessel 22 and conventional power controls 24 and gas controls 26 operatively connected thereto, a primary electrode E1 usually of a plasma torch form, a secondary (usually grounded) electrode E2 which together with E1 is used for initial controlled establishment of an ionization plasma in the vessel. Feed-throughs FT enable feeding of block B and withdrawal of an ingot stub IS and an eventual ingot I, the latter being produced by transferring the ionization plume to run from E1 and B and then B to I. The innermost end of B is brought to above its melting temperature and standing isotherms Ta, Th, Tc indicate a gradient of temperature along the length of B (which can be facilitated by forced cooling of the vessel wall and/or feed-throughs). The melt at the end of the B drips into a molten pool MP at the top of the ingot which has a cooling gradient along its length. The block B is continuously fed and the ingot I continuously withdrawn. The atmosphere of the furnace has an inert gas such as argon or helium continuously or stepwise flowing in and out of the vessel and recirculated with close throughput and pressure controls compensating for outgas bursts from the solid materials that are processed. The gas flow is controlled to a steady state ionization supporting pressure of from 0.1 to 1.0 bar or more, usually about 0.5 bar for tantalum as explained below. The inert gas is mixed with gaseous products of the reaction like CO, $N_2$, etc. evolved from the melt ends of B and M (MP). While the inert gas is being filtered outside the plasma furnace vessel such inert gas is "filtered" by exposure to solvents that selectively remove the carbon monoxide and nitrogen. FIG. 1A indicates schematically this mode of valve-controlled access to the solvent S (with heater H driving desorption when isolated from the plasma furnace recirculation).

The above described structure and process may be compared to conventional carbothermal reduction in a sinter furnace at low pressure (referred to herein sometimes as "sinter process route") and to electron beam refining used as an adjunct to the sinter furnace carbothermal reduction or as an independent refining means. The carbothermal reduction in a sinter furnace at low pressure produces a non-uniform heating of the carbon-refractory metal charge, takes very long times compared to liquid metal processing at atmospheric pressure and ultimately results in high residual carbon which is deleterious to end product usage or is removed from the end product only through expensive post processing. Electron beam furnace treatment is (with limited exceptions not germane here) conducted at high vacuum with removal of process gas and volatilized oxides at a cost of pumping requirements and excessive loss of refractory metal. For completeness one must include the common state of the art method of scrap recovery through digestion by acids and complete (or nearly so) hydrometallurgical processing and sodium reduction.

Figure 2:
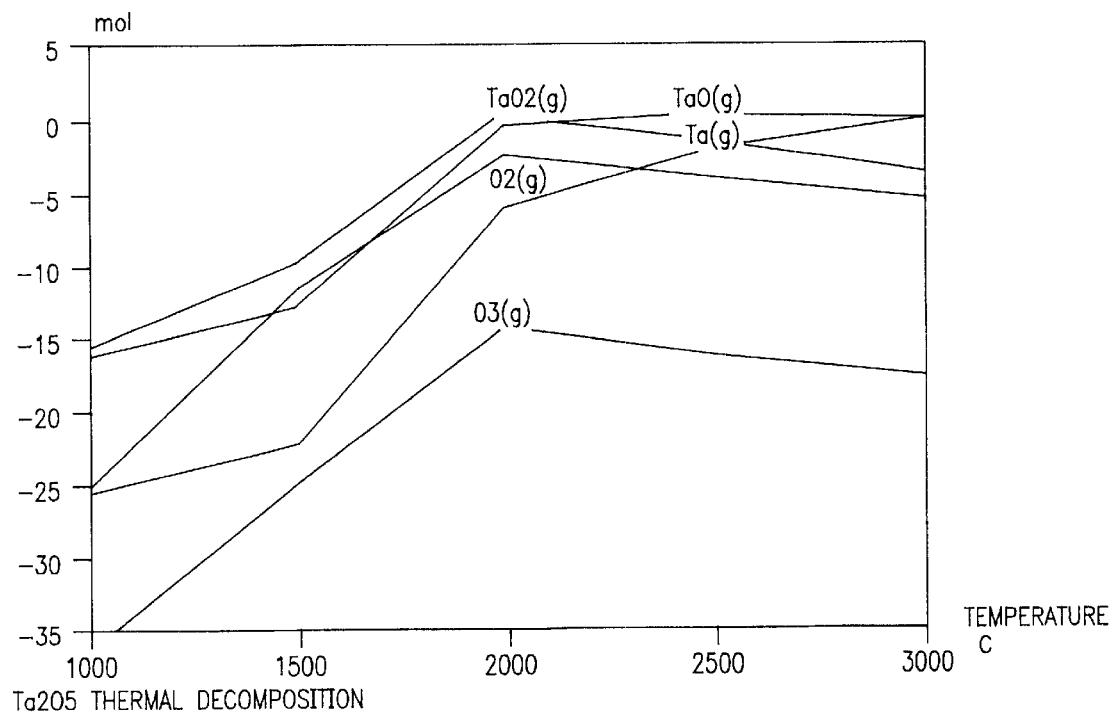
FIGS. 2 and 3 are plots of gas evolution (in mols) vs. temperature for carbon-tantalum reaction.
Figure 3:
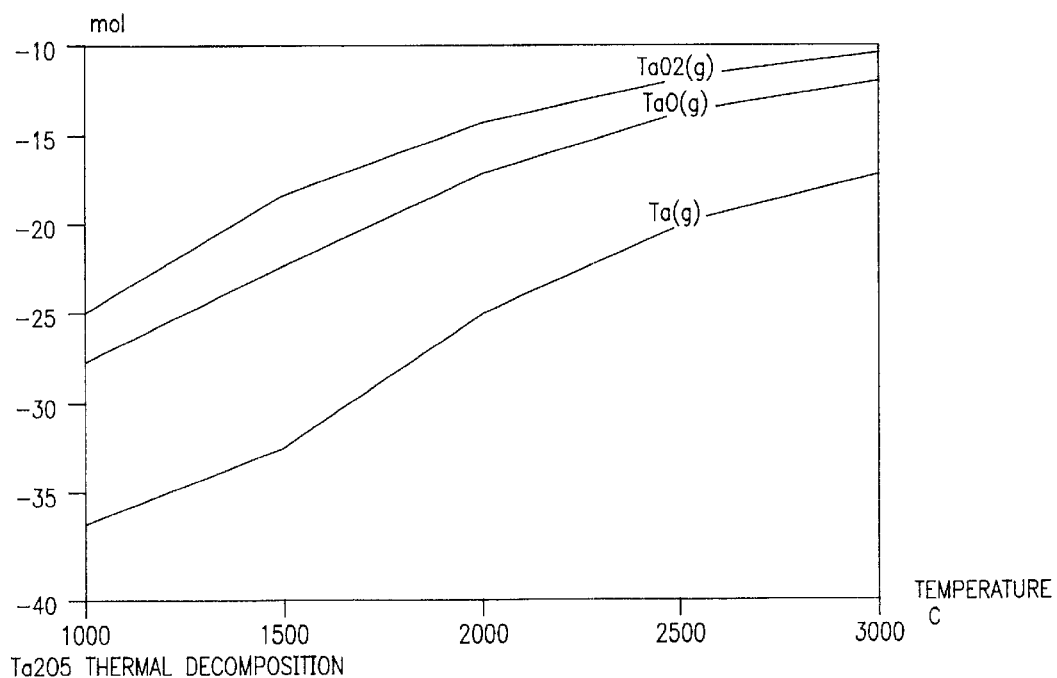

FIGS. 2 and 3 demonstrate the difference in values of partial pressures of tantalum oxide species in the temperature range 1000–3000° C. as a function of total pressure. It can be seen from FIGS. 2 & 3 that at $10^{-4}$ bar total pressure virtually all tantalum pentoxide will evaporate above ~1700° C., while at 1 bar total pressure tantalum pentoxide will be very stable in the temperature range 1000–3000° C.

EXAMPLE 1

Sintering of Tantalum Scrap Blend Demonstrating Poor Melt Rates

In this example 2248.4 lbs. (98.7%) of uncrushed tantalum anodes, 30 lbs. carbon powder (1.3%), and 33.5 lbs. of water were blended together, consolidated into rectangular bars, dried at 200° C., sintered in a resistance furnace for 7 hours at 2000° C. and 1 millibar pressure, and then refined in an electron beam furnace at the temperature 100–300° C. above the melting point of tantalum. The starting concentrations of oxygen and carbon in the blend were 27,130 ppm and 15,980 ppm, respectively. The ratio of C/O was calculated to be 78.5% of stoichiometric and should have theoretically reduced the oxygen content of the compacted blend to 5,823 ppm after sintering. The average oxygen concentration, of six sinter bar samples, was tested to be 679 ppm and the residual carbon concentration, expected to be, negligible, was tested to be 3,058 ppm. High levels of carbon were found in the sintered bars suggesting that tantalum carbide was formed during sintering. These higher than expected oxygen losses, the high residual carbon, and the presence of heavy metallic residues on the furnace chamber walls suggest the evaporation of tantalum oxide during sintering and indicate a disadvantageous process. The actual concentrations of oxygen and carbon in the sintered bars were quite variable, an indication that overheating of the bars occurred in an uneven manner. The material balance also showed a higher than expected loss of 16.3 lbs.

A result of this poor sintering run was a low electron beam first melt rate (melt rate =time in minutes to melt a 50 lb. bar). This is due in principle to tantalum carbide reacting with oxygen in the feedstock to form carbon monoxide gas during the melting process. The rate of tantalum carbide annihilation was extremely slow due to its high stability. The average bar melt rate for one of the heats averaged 43.9 minutes/bar with several of the bars taking 70 minutes to melt. While the overall yield was 92.5% this process had problems through presence of tantalum carbides in the resulting ingot required it to be reprocessed at high cost and reduction of productivity of the electron beam furnace from a theoretical maximum value of 300 lbs./hr to 68.3 lbs./hr or 23%. Loss of productivity has a dramatic effect on the capacity of the furnace and production planning.

EXAMPLE 2

Sintering of Tantalum Scrap Blend Demonstrating Poor Yields

In this example, 2359 lbs. (98.4%) of tantalum anodes, 38.75 lbs. (1.6%) carbon powder and 35.4 lbs. of water were processed in the same manner as in Example 1. The starting concentrations of oxygen and carbon in the blend were 27,940 ppm and 16,160 ppm respectively. The ratio of C/O was calculated to be 77. 1 % of stoichiometry and should have theoretically reduced the oxygen content of the compacted blend to 6,393 ppm after sintering. The average oxygen and carbon concentrations, of six sinter bar samples, were 4,516 ppm and 1,354 ppm respectively. The average results indicated that the sintering process had removed the correct amount of oxygen, but the residual carbon content of the six sinter bar samples, (1234, 679, 262, 1328, 824, and 3797 ppm), contradicted this conclusion. A review of weight loss data for this sintering run revealed a total loss of 122 lbs. or about 70.3 lbs. greater than that which can be attributable to oxygen removal alone. The expected oxygen loss was calculated to be 51.7 lbs.

The actual bar melt rate for one heat averaged 71 minutes per 50 lb. bar. The overall yield was 81.8%, and the productivity of the electron beam furnace was reduced from the theoretical maximum value of 300 lbs./hr to 36.1 lbs./hr or 12%. This example demonstrate problems of incomplete reaction of carbon and oxygen resulting in low melt rates, poor yield as a result of low melt rates and residual oxygen in the sintered bars, and inability after sintering to analyze bar composition and predict electron beam melt rates and yields.

EXAMPLE 3

Dramatic Loss of Tantalum Oxide Resulting in Tantalum Carbide Formation

In this example, 2289.2 lbs. of tantalum anodes, 33.16 lbs. carbon powder, and 34.1 lbs. of water were processed in the same manner as in the previous two examples. The starting concentrations of oxygen and carbon in the blend were 24,890 ppm and 14,280 ppm respectively. The ratio of C/O. was calculated to be 76.5% of stoichiometry and should have theoretically reduced the oxygen content of the compacted blend to 5,850 ppm after sintering. The average oxygen and carbon concentrations of six sinter bar samples were 1,976 ppm and 2,949 ppm respectively. The carbon analysis for the six individual sinter bar samples were 2144, 1729, 1587, 615, 5591, and 6029 ppm. Of the first three examples, these sinter bars contain the highest amount of residual carbon. The carbon results range from 625 ppm to 6029 ppm, an indication that temperature fluctuations in the bars has resulted in evaporation of tantalum oxide to different degrees in sintering. Bulk chemical analysis of the EB refined ingot revealed a residual carbon content of 433, 797 and 469 ppm at the top, middle, and bottom respectively. Metallographic analysis on a wafer of one ingot showed the presence of tantalum carbide.

The EB melt rate was 54 min./bar and the EB yield was better than expected at 91.3%. By themselves the melt rate and yield were not alarming, but a poor melt rate with a good yield is unusual. This can be explained by considering tantalum oxide evaporation during the sinter steps of the sinter process route. As the C/O ratio is increased above 60% the majority of carbon has reacted with oxygen to form CO gas in the early stages of sintering, but in the latter stages overheating of the bars caused tantalum oxide to evaporate. The result is a significant amount of excess carbon and just enough residual oxygen in the bars to affect EB melt rates negatively. Since the majority of oxygen has reacted with carbon very little tantalum oxide is evaporated in the electron beam furnace and the yield is good. The evaporation of Ta (g) is considerably less than that of tantalum oxide. This example demonstrates problems of tantalum carbide formation in electron beam melting due to excess carbon in the sintered bars. Once formed tantalum carbide can only be removed by reprocessing the ingot into a powder, combining with tantalum scrap containing sufficient oxygen, and electron beam refining a second time. The initial manufacturing effort is a complete loss. There also exists the chance that the discrete tantalum carbide precipitates could go undetected causing significant manufacturing problems downstream. The example also demonstrates problems of poor melt rate resulting from reaction of tantalum carbide and oxygen to form CO gas and inability to predict electron beam melt rates & yields based on sinter bar analysis.

EXAMPLE 4

Plasma Melting of Oxidized Tantalum Scrap Containing 60% & 90% Carbon/Oxygen Stoichiometry A series of experiments was designed and performed to evaluate the effect of system total pressure, the stoichiometric ratio of carbon to oxygen, and input oxygen concentration on the carbothermic reduction process. Each trial consisted of a 100 lb. blend of milled tantalum scrap anodes of various oxygen concentrations and carbon powder. The experimental conditions are defined in the following table.

| Experiment | Pressure (Bars) | Oxygen ppm | Carbon/Oxygen |
|---|---|---|---|
| 1 | 0.5 | 9,046 | 60% |
| 2 | 0.5 | 9,046 | 90% |
| 3 | 0.5 | 18,472 | 60% |
| 4 | 0.5 | 18,472 | 90% |
| 5 | 0.5 | 29,393 | 60% |
| 6 | 0.5 | 29,393 | 90% |

The system total pressure was increased from 1 millibar of current sintering processes to 0.5 Bar absolute pressure in the plasma furnace. Helium was used as a carrying gas.

Two stoichiometric ratios of carbon/oxygen were used, 60% and 90%.

Three oxygen concentrations, 9,046 ppm, 18,472 ppm, and 29,393 ppm were used.

The anodes were milled into a powder to facilitate the carbon oxygen reaction.

The composition results (interstitials in ppm) are shown as follows at C/O ratio 60 and 90% stoichiometric, as follows:

| 60% C/O Ratio | | | |
|---|---|---|---|
| Input Oxygen | 9046 | 18472 | 29393 |
| Output Oxygen | 2853 | 3728 | 6700 |

|                          | -continued |        |        |
|--------------------------|-----------|--------|--------|
| Theoretical Output Oxygen | 3291     | 6077   | 11200  |
| Output Carbon            | 39        | 45     | 107    |
| Input Nitrogen           | 87        | 251    | 289    |
| Output Nitrogen          | 41        | 126    | 105    |
| 90% C/O Ratio            |           |        |        |
| Input Oxygen             | 9,219     | 18,767 | 29,393 |
| Output Oxygen            | 1,481     | 754    | 1,384  |
| Theoretical Output Oxygen | 1,596    | 1,447  | 2,800  |
| Output Carbon            | 103       | 171    | 128    |
| Input Nitrogen           | 77        | 251    | 289    |
| Output Nitrogen          | 30        | 79     | 54     |

As the oxygen concentration in the feed material increases the loss due to evaporation of tantalum oxide increases. This is illustrated by comparing the predicted (theoretical) output oxygen to the actual output oxygen. The gap between the actual and theoretical values widens as the input concentration of oxygen increases.

By reducing the scrap to a fine powder one improves the efficiency of the reaction between carbon and oxygen. A benefit of this is a reduction in losses due to evaporation of tantalum oxide. Comparing the 60% C/O results to the 90% C/O results shows that loss of oxygen in excess of that removed by carbon decreases as the C/O ratio is increased.

In each of the plasma melting experiments the nitrogen concentration in the feed was reduced on average from about 250 ppm to 100 ppm. Nitrogen cannot be removed by the standard sintering process due to the stability of tantalum nitride at 2,000° C. Operating the process at 3000° C. results in lower nitrogen in the feedstock to the electron beam furnace, reducing gas loads and improving melt rates.

The effect of increasing the system total pressure to 0.5 Bar absolute is demonstrated by comparing the results of example 3 and the 90% stoichiometric plasma melt of this Example with 29,393 ppm oxygen in the feed.

| Example | Ratio - C/O | O in Feed | C in Ingot | Temperature | Pressure |
|---------|-------------|-----------|------------|-------------|----------|
| Plasma Melt (4) | 90% | 29,393-ppm | 128 ppm | 3000° C. | 0.5 Bar |
| Example #3 | 76.5% | 25,253 ppm | 566 ppm. | 2000° C. | 1 millibar |

Example 3 evaporation of tantalum oxide resulted in excess carbon in the sinter bars and 566 ppm carbon in the form of tantalum carbide in the ingot. In this plasma experiment of Example 4, the ratio of C/O was 18% greater and the temperature was 1000° C. higher than in Example 3, but the residual carbon in the plasma melted ingot was only 128 ppm. As stated above, evaporation of tantalum oxide is suppressed at the higher pressure and this allows the carbon & oxygen to react completely. These results were consistent for all of the plasma melts.

As the C/O ratio is increased from 60% to 90% the losses due to evaporation of tantalum oxide are reduced and the residual carbon contents are still low. This proves that essentially 100% of oxygen was removed in the form of CO gas.

Kinetics is improved by milling the anodes into powder, the rate of reaction is increased by increasing the temperature of the reaction, and evaporation of tantalum oxide is suppressed by increasing the system total pressure.

EXAMPLE 5

Comparison of Tantalum Ingot Production via Plasma Melting using 90% Stoichiometry to Standard Sintering Process 1,000 lbs. of tantalum scrap anodes containing 42,000 ppm oxygen were split and processed using two manufacturing routes.

| Sinter Route | Sintering/Melting Route |
|--------------|-------------------------|
| Blend Anodes (42% C/O) | Mill anodes into powder |
| Press into bars | Blend powder (90% C/O) |
| Sinter at 2000° C. & 1 millibar | Press into bars |
| EB 1st melt at $10^{-4}$ millibar | Sinter 1500° C. for strength |
| EB remelt at $10^{-4}$ millibar | Plasma 1" melt at 0.5 bar absolute |
|  | EB remelt at $10^{-4}$ millibar |

SINTER PROCESS ROUTE with 2,000° C. SINTER in Vacuum (1 millibar)

In the sinter process route 500 lbs. of uncrushed anodized anodes (containing 472.1 lbs. Ta) are coated with carbon powder, compacted, sintered to react carbon & oxygen, and double EB melted. The starting oxygen concentration was 42,000 ppm. 6.73 lbs. (42.7% stoichiometry) was added to the batches. Further additions of carbon can lead to the formation of tantalum carbides. If there were no losses of tantalum oxides due to evaporation, the predicted tantalum yield would be 100% and the oxygen concentration after sintering would be 24,870 ppm. The actual tantalum weight after sintering was 434.9 lbs. (92.1% yield). The oxygen and carbon contents after sintering were 16,235 ppm and 74 ppm, respectively.

Yield losses in electron beam melting of tantalum are controlled by the amount of tantalum oxide present, temperature, and the evolution of gases during melting. Thermodynamic calculations show that TaO(g), a suboxide of tantalum, has the highest partial pressure at a temperature of 3000° C. and $10^{-3}$ millibar total pressure (see FIG. 2). For each atom of oxygen lost one atom of tantalum is also lost to evaporation. If there were no losses due to evaporation of tantalum oxides the oxygen in the feed to the EB furnace would be 24,870 ppm which translates to a predicted yield of 74.2%. These are the losses due only to evaporation of tantalum oxide and do not include losses due to evaporation of Ta (g). The double melted EB ingot contained 301 ppm oxygen and requires a third EB melt. The carbon content of the double melt EB ingot was 53 ppm. (i.e. above the 50 ppm specification).

Figure 4:
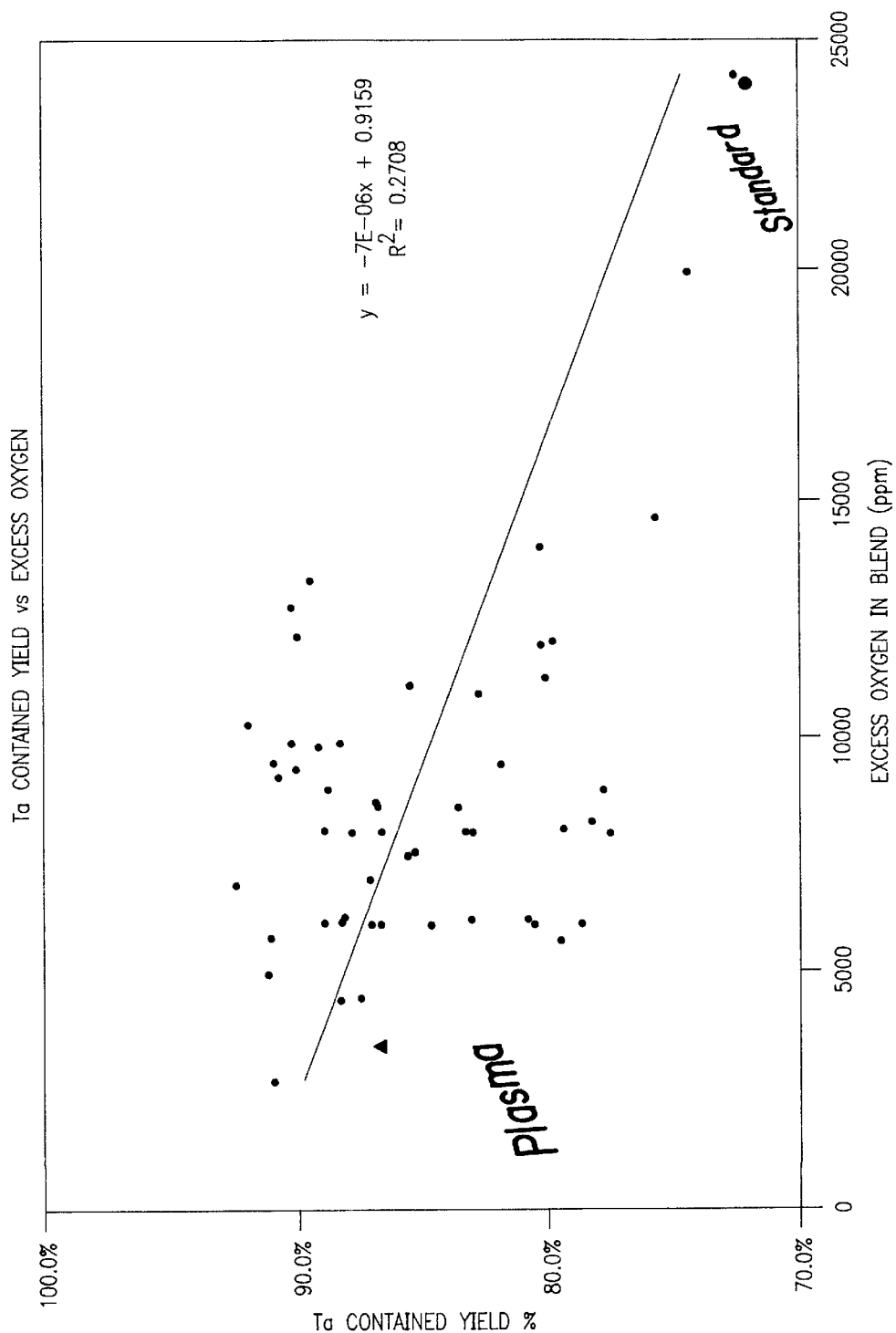
FIG. 4 is a plot of yield percent (%) vs. excess oxygen amount (in ppm).

A plot of electron beam melting yields versus anodized anode blend excess oxygen illustrates the relationship found in practice (see FIG. 4). A linear regression depicts the best-fit relationship for the data. The large round data point at the far right is a prediction of the result of this experiment. It is in good agreement with the linear regression.

SINTER MELTING PROCESS ROUTE AT ATMOSPHERIC PRESSURE

In this example a plasma arc melting technique was used to provide sintering I melting conditions at a pressure close to atmospheric. The plasma melting route substitutes a single plasma melt at 3000° C. for the 2000° C. sinter and the EB first melt used in the standard route, above; increases the ratio of carbon/oxygen from 42% to 90% of stoichiometry; carries out the process at 0.5 bar absolute pressure compared to the normal sintering route where the pressure is less than 1 millibar; and mills the anodes into a powder to improve kinetics of reaction, with the following results:

Tantalum contained in the input material is 542.1 lbs.

Tantalum contained in the output depends on the amount of evaporation of tantalum bearing species. The actual amount of tantalum contained in the output was calculated to be 535.9 lbs. or 98.2% of the input tantalum.

The yield after plasma melting (98.2%) was much higher compared to the yield after sintering (92.1%). The oxygen and carbon contents after melting were 6517 ppm. and 263 ppm., respectively. This proves that the evaporation of tantalum oxides is significantly reduced. The CIO stoichiometry was also significantly increased while removing about twice as much oxygen from the input as the original sinter process route.

The residual carbon analysis of the ingot demonstrates the feasibility of the plasma melting process to react essentially all carbon and oxygen, especially when operated at higher system pressures.

Refinement of the process is necessary to eliminate the last traces of residual carbon.
The plasma-melted ingot was remelted in the electron beam furnace using normal remelt parameters. The melt rate was 62.8 lbs./hr. which is lower than expected. There was an evolution of gases during melting which slowed the melting process. This is related to residual carbon and oxygen in the plasma-melted ingot.

The overall yield, calculated by multiplying the yields for both plasma (92.9%) & EB (88.3 %) melting, was 86.7%. This is a 14.5% increase in yield over the actual yield for the sinter process route of 72.2%. This is a significant improvement over the current process.

Improvements to minimize residual carbon in the plasma-melted ingot will lead to additional improvement in the yields.

By deoxidizing crushed tantalum scrap with carbon in the inert atmosphere under atmospheric pressure, one can purify the material to a much higher degree compared to conventional pyrovacuum technique. The longevity of the plasma melting operation is much lower than that of pyrovacuum sintering. Another plus is that material processed to the present invention will require less electron beam refining operating time, which increases the capacity of the electron beam furnace.

The process of the invention can be carried out in any high temperature equipment which can be run under 1/10th to full atmospheric pressure such as, e.g., a plasma furnace, induction furnace lined with high temperature refractory, magnetically levitated or gas suspended mass of powders, EB drawn out from vacuum for a short distance, arc furnace, resistance furnace, and other known means of matching high pressure, high temperature.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. The method of refining high oxygen sources of refractory metal(s) comprising the step of intermixing a solid reducing agent the refractory metal(s) and heating the metal (s) with the intermixed solid reducing agent with at a temperature at or above melting point of the metal while suppressing partial pressure of oxides of the refractory metal through maintenance of an elevated pressure environment to produce a refined refractory metal, the process being controlled so that only a portion of the intermixed reducing agent and source material melts at a time while the oxide of solid adjacent source material is reduced before melting as well as during its eventual melting, the process being further controlled to effect substantial oxygen, nitrogen removal while suppressing carbide formation and over 90% by weight of the refractory metal of the source is recovered.

2. The method of claim 1 wherein the reducing agent is carbon.

3. The method of claim 1 wherein the source material is particulated and intimately mixed with a particulated solid reducing agent.

4. The method of claim 3 wherein the intermixed particulate materials are consolidated into a coherent form.

5. The method of either of claims 3 or 4 wherein the particulation level is minus 30 mesh.

6. The method of any of claims 1–4 wherein the refined refractory metal is then electron beam melted and resolidified.

7. The method of claim 6 wherein the refractory metal is tantalum.

8. The method of any of claims 1–4 wherein the refractory metal is tantalum.

9. The method of claim 8 wherein the pressure in the mixture environment is 0.1 to 1.0 bar and the reducing agent is carbon provided in a carbon/oxygen (C/O) ratio of at least 80% of stoichiometric.

10. The method of claim 9 wherein the C/O ratio is about 90% of stoichiometric.

11. The method of claim 8 wherein the ambient pressure is maintained at a level where an increase of refractory metal oxide partial pressure and gas phase refractory metal evaporation substantially levels off.

12. The method of any of claims 1–4 wherein the ambient pressure is maintained at a level where the increase of refractory metal oxide partial pressure and gas phase refractory metal evaporation substantially levels off.

13. The method of refining high oxygen sources of refractory metal(s) comprising the step of intermixing a solid reducing agent with the refractory metal(s) and heating the metal(s) with the intermixed solid reducing agent at 1000–3000° C. while suppressing partial pressure of oxides of the refractory metal through maintenance of an elevated pressure environment to produce a refined refractory metal, the process being controlled so that only a portion of the intermixed reducing agent and source material melts at a time while the oxide of solid adjacent source material is reduced before melting as well as during its eventual melting, the process being further controlled to effect substantial oxygen, nitrogen removal while suppressing carbide formation and over 90% by weight of the refractory metal of the source is recovered.

14. The method of claim 13 wherein the reducing agent is carbon.

15. The method of claim 13 wherein the source material is particulated and intimately mixed with a particulated solid reducing agent.

16. The method of claim 15 wherein the intermixed particulate materials are consolidated into a coherent form.

17. The method of either of claims 15 or 16 wherein the particulation level is minus 30 mesh.

18. The method of any of claims 13–16 wherein the refined refractory metal is then electron beam melted and resolidified.

19. The method of claim 18 wherein the refractory metal is tantalum.

20. The method of any of claims 13–16 wherein the refractory metal is tantalum.

21. The method of claim 20 wherein the pressure in the mixture environment is 0.1 to 1.0 bar and the reducing agent is carbon provided in a carbon/oxygen (C/O) ratio of at least 80% of stoichiometric.

22. The method of claim 21 wherein the C/O ratio is about 90% of stoichiometric.

23. The method of claim 20 wherein the ambient pressure is maintained at a level where an increase of refractory metal oxide partial pressure and gas phase refractory metal evaporation substantially levels off.

24. The method of any of claims 13–16 wherein the ambient pressure is maintained at a level where the increase of refractory metal oxide partial pressure and gas phase refractory metal evaporation substantially levels off.

\* \* \* \* \*

UNITED STATES PATENT AND TRADEMARK OFFICE
CERTIFICATE OF CORRECTION

PATENT NO. : 6,197,082 B1
DATED : March 6, 2001
INVENTOR(S) : Robert A. Dorvel, Leonid N. Shekhter, Ross W. Simon Page 1 of 1

It is certified that error appears in the above-identified patent and that said Letters Patent is hereby corrected as shown below:

ABSTRACT,
In the first sentence, replace "participation" with -- particulation --.

Column 9,
Line 13, replace "CIO" with -- C/O --.

Signed and Sealed this

Eleventh Day of December, 2001

Attest:

NICHOLAS P. GODICI
*Attesting Officer*   *Acting Director of the United States Patent and Trademark Office*